United States Patent [19]

Ishii et al.

[11] Patent Number: 5,251,293
[45] Date of Patent: Oct. 5, 1993

[54] CHARACTER DISPLAY APPARATUS

[75] Inventors: Takatoshi Ishii; Taiju Ogawa; Shozo Omae, all of Tokyo, Japan

[73] Assignee: Ascii Corporation, Minato, Japan

[21] Appl. No.: 561,371

[22] Filed: Jul. 31, 1990

Related U.S. Application Data

[63] Continuation of Ser. No. 239,186, Aug. 31, 1988, abandoned.

[30] Foreign Application Priority Data

Sep. 2, 1987 [JP] Japan ............................. 62-219576
Oct. 9, 1987 [JP] Japan ............................. 62-255042

[51] Int. Cl.$^5$ .............................................. G06F 15/66
[52] U.S. Cl. .................................. 395/151; 395/150;
395/144; 345/143
[58] Field of Search ............... 364/518, 521; 340/747,
340/740, 735; 395/144, 150, 151

[56] References Cited

U.S. PATENT DOCUMENTS

4,670,841  6/1987  Kostopoulos ............... 364/419
4,723,217  2/1988  Nakano et al. ............. 364/518
4,785,391  11/1988  Apley et al. ............... 364/518

*Primary Examiner*—Phu K. Nguyen
*Attorney, Agent, or Firm*—Hoffmann & Baron

[57] ABSTRACT

A character display apparatus comprises at least a memory for storing a character code designating a desirable character and attribute data designating an attribute thereof as one pair of data; a first character generator for pre-storing font data corresponding to English characters and figures; a second character generator for pre-storing font data corresponding to Chinese characters; a judgment portion and a control portion. The judgment portion judges whether one character is designated by one character code or two or more character codes which are read from the memory in accordance with scanning of a display screen. Based on the judgment result of this judgment portion, character reading operation of the control portion is controlled. Next, in the case where the alpha-numeric characters are to be displayed, the font data corresponding to the character code read from the memory are read from the first character generator so that each of the alpha-numeric characters will be displayed in the attribute represented by the attribute data accompanied with the character code under control of the control portion. On the other hand, in the case where the Chinese characters are to be displayed, the font data corresponding to the character code read from the memory are read from the second character generator so that each Chinese character will be displayed in the attribute represented by the attribute data accompanied with the character code.

1 Claim, 5 Drawing Sheets

CHARACTER DISPLAY APPARATUS

This is a continuation of copending application Ser. No. 07/239,186 filed on Aug. 31, 1988 now abandoned.

BACKGROUND OF THE INVENTION

1. Field of the Invention

The present invention relates to a character display apparatus, and more particularly to a character display apparatus which is suitable for displaying Chinese characters.

2. Prior Art

Recently, personal computers are remarkably widespread. Particularly, specifications of the personal computers used in the Europe and America (hereinafter, referred to as "Western standard type specifications") have become the world-wide standards. Therefore, many superior softwares which meet these specifications have been developed. In addition, these personal computers having the same standard are produced in a large-scale production, so that the price thereof becomes inexpensive.

By the way, it is sufficient to display alpha-numeric characters (i.e., alphabet characters and figures etc.) as display characters in the personal computers having the European and American standard (hereinafter, referred to as "Western standard type personal computers"). Meanwhile, in order to execute softwares for Japanese in such personal computers, a function for displaying the Chinese characters must be required. In this case, it becomes possible to display any Chinese characters by selecting a graphic mode. However, when a text function (i.e., a character displaying function) is executed as described above, it is disadvantageous in that the execution speed must become slow. In addition, there is no compatibility among these softwares. Further, there is a demerit in that it is extremely troublesome to transfer such softwares.

In the above-mentioned computers, one byte code representative of the alpha-numeric characters and one byte data representative of an attribute are stored and then read out as one pair data.

For example, in order to display the Chinese characters etc. other than the alpha-numeric characters, a character code must need more than one byte. Hence, the system for storing the character code and attribute data in a memory must be different from that of the Western standard type personal computers. This causes a problem in that it is impossible to obtain the compatibility between the softwares for Japanese and the softwares of the Western standard type personal computers. In addition, in order to display the Chinese characters etc., it is demanded to further enlarge the attribute function.

SUMMARY OF THE INVENTION

Accordingly, it is a primary object of the present invention to provide a character display apparatus which can display the Chinese characters etc. in the text mode even when the Western style computer is used so that it will become possible to set the execution speed higher and obtain the compatibility and portability with ease.

It is another object of the present invention to provide a character display apparatus which can enlarge the attribute function but maintain the compatibility for executing the softwares of the Western style computers.

In a first aspect of the invention, there is provided a character display apparatus for displaying several kinds of characters comprising:

(a) a memory portion for storing character codes each designating each character and attribute data representative of an attribute of the character;

(b) a first character generator for pre-storing font data corresponding to alpha-numeric characters;

(c) a second character generator for pre-storing font data corresponding to Chinese characters;

(d) a judgment portion for judging whether one character is designated by one character code or two or more character codes which are read from the memory portion in accordance with scanning of a display screen; and (e) a control portion for reading out the font data corresponding to the character code from the first character generator based on the judgment result of the judgment portion when the alpha-numeric characters are to be displayed, so that each of the alpha-numeric characters is displayed in the attribute represented by the attribute data accompanied with the character code, the control portion reading out the font data corresponding to the character code from the second character generator based on the judgment result of the judgment portion when the Chinese characters are to be displayed, so that each of the Chinese characters is displayed in the attribute represented by the attribute data accompanied with the character code.

In a second aspect of the invention, there is provided a character display apparatus for displaying several kinds of characters comprising:

(a) a memory for storing at least character codes, one character code or two or more character codes designating one character;

(b) a character code fetch portion for fetching the character codes from the memory in accordance with scanning of a display screen;

(c) a judgment portion for judging whether one character is designated by one character code or two or more character codes which are fetched by the character code fetch portion;

(d) a character generator for pre-storing font data of character;

(e) an address generating portion for generating an address of the character generator at which the font data of character designated by the character codes is stored by referring to certain number of the character codes which are required for designating the character based on the judgment result of the judgment portion; and (f) a dot data generating portion for generating serial dot data for display in response to generated address based on the font data read from the character generator, whereby the character is to be displayed based on this serial dot data.

In a third aspect of the invention, there is provided a character display apparatus for displaying several kinds of characters comprising:

(a) a memory for storing character codes and attribute data each accompanied with each character code, one character code or two or more character codes designating one character;

(b) a judgment portion for judging whether one character is designated by one character code or two or more character codes which are read from the memory in accordance with scanning of a display screen;

(c) a character generator for pre-storing font data of character;

(d) font data reading means for reading the font data of the corresponding character from the character generator by referring to certain number of character codes which are required for designating the character based on the judgment result of the judgment portion; and (e) an attribute control portion for recognizing the attribute data accompanied with second or following character code as extended attribute data based on the judgment result of the judgment portion when one character is designated by two or more character codes, whereby the attribute control portion controls character display in accordance with an attribute represented by the extended attribute data and the attribute data accompanied with first character code.

BRIEF DESCRIPTION OF THE DRAWINGS

Further objects and advantages of the present invention will be apparent from the following description, reference being had to the accompanying drawings wherein a preferred embodiment of the present invention is clearly shown.

In the drawings.

DESCRIPTION OF A PREFERRED EMBODIMENT

Hereinafter, description will be given with respect to an embodiment of the present invention by referring to the drawings.

[A] CONSTITUTION OF AN EMBODIMENT

Figure 1:
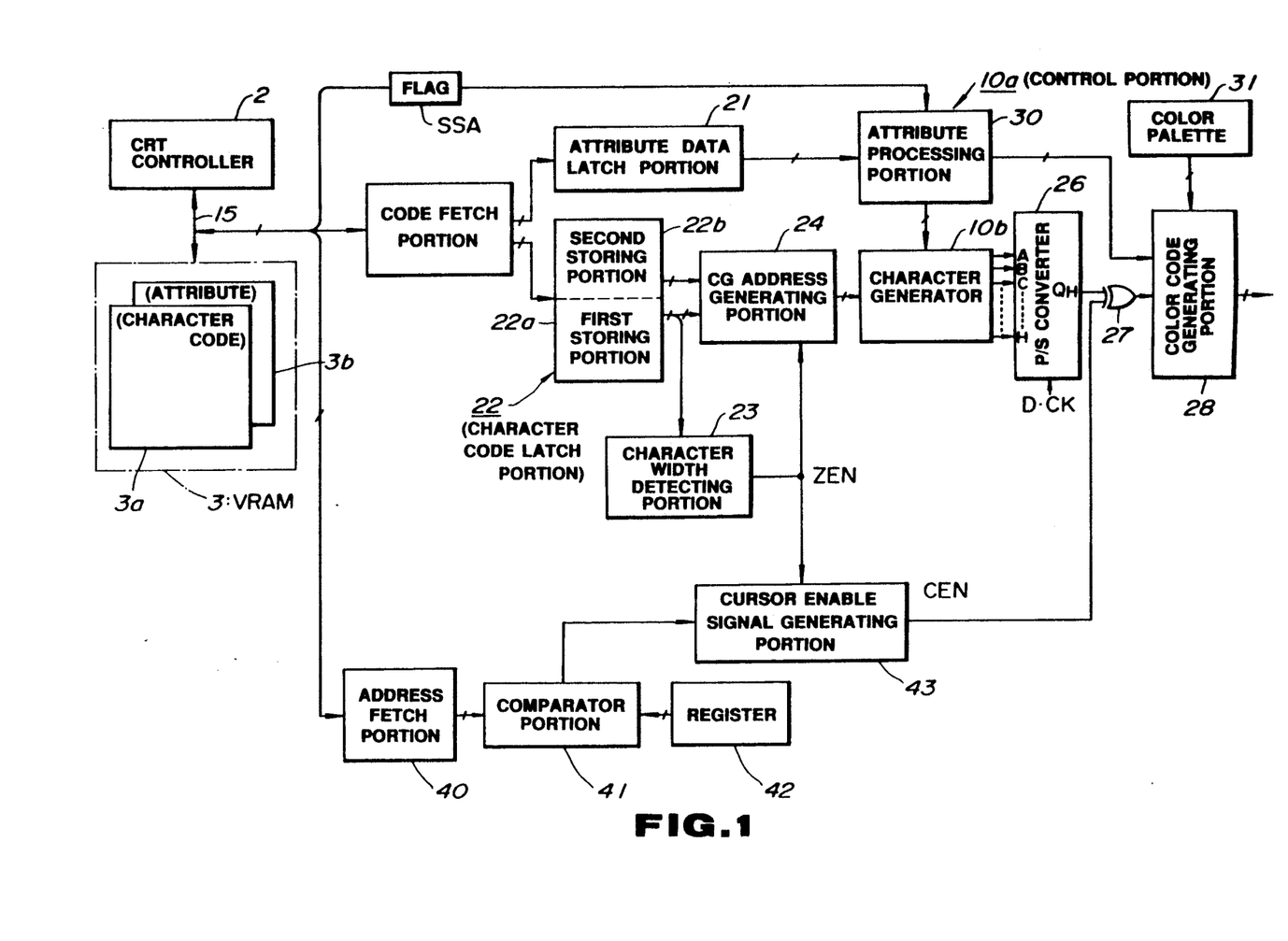
FIG. 1 is a block diagram showing a constitution of an embodiment of the present invention.
Figure 2:
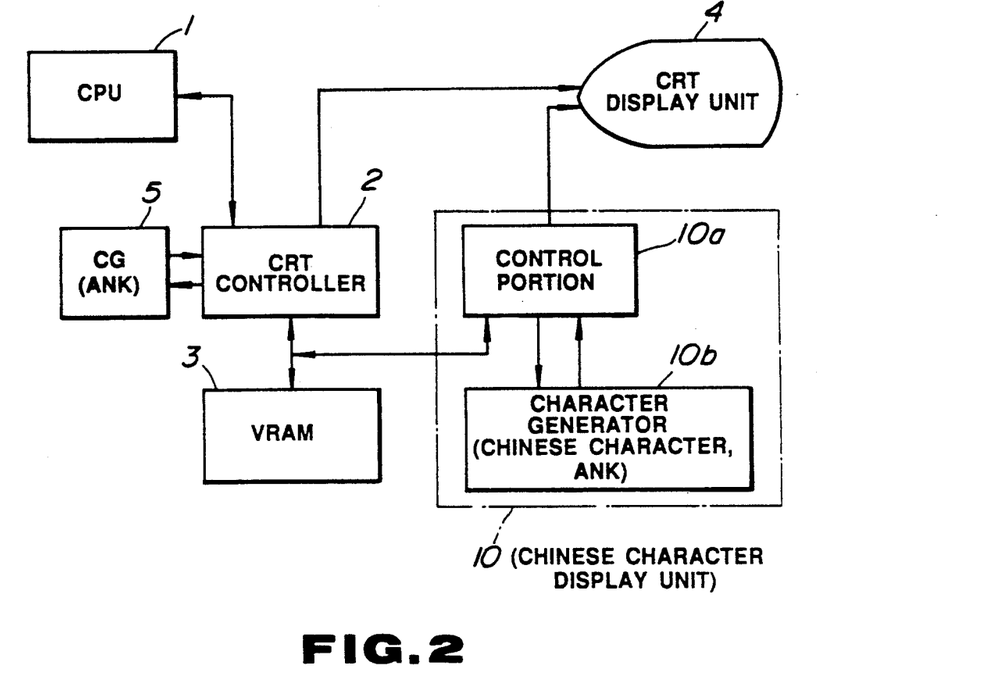
FIG. 2 is a block diagram showing a whole constitution of display system to which the present embodiment can be applied.

FIG. 1 is a block diagram showing the constitution of an embodiment of the present invention, and FIG. 2 is a block diagram showing the whole constitution of the display system to which the present embodiment can be applied.

In FIG. 2, 1 designates a central processing unit (CPU) which is equipped within the Western standard type personal computer, for example. This CPU 1 operates based on the predetermined programs. This CPU 1 controls a CRT controller 2 so that several data can be transferred between the CPU 1 and the CRT controller 2. The CRT controller 2 controls a display operation of a CRT display unit 4. In addition, the CRT controller 2 reads data within a video random access memory (VRAM) 3 in accordance with the scanning of display screen, and then this CRT controller 2 performs a display control based on the such read data. In this case, the VRAM 3 consists of a first plane 3a and a second plane 3b as shown in FIG. 1. In the text mode, the first plane 3a stores the character codes, while the second plane 3b stores the attribute data representative of display characters.

Figure 3A:
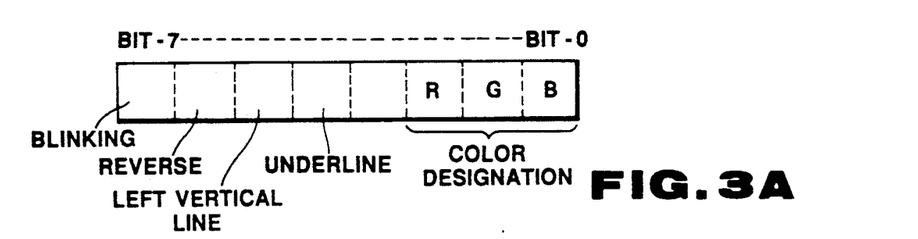
FIGS. 3A and 3B show formats of the attribute data in the present embodiment.
Figure 3B:
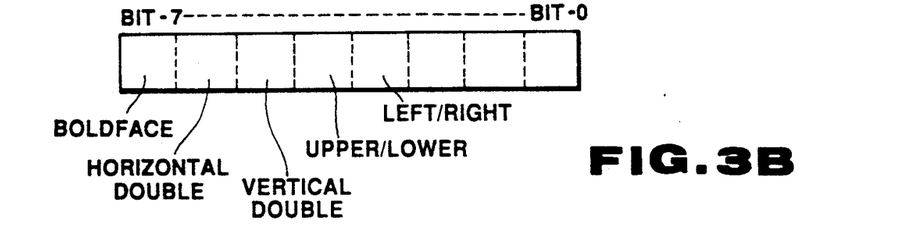

The above attribute data are data of eight bits as shown in FIGS. 3A and 3B, and there are two kinds of attribute data, i.e., basic attribute data and extended attribute data. Each bit of each attribute data has a specific function as shown in FIGS. 3A and 3B. In the basic attribute data shown in FIG. 3A, bit-0 to bit-2 have a function for designating colors. More specifically, these bit-0, bit-1 and bit-2 command on/off of blue, green and red colors respectively. In addition, bit-4 and bit-5 command to display an underline and a left vertical line respectively, bit-6 designates a reversed character (whose color is set as a reversed background color), and bit-7 designates a blinking character. On the other hand, in the extended attribute data shown in FIG. 3B, bit-7 designates a boldfaced character, bit-6 designates a horizontally double-enlarged character, and bit-5 designates a vertically double-enlarged character. In addition, bit-4 is the bit for designating one of an upper side or a lower side of font which is to be displayed when the vertical double-enlargement is designated. More specifically, the upper side of font is selected when the value of this bit-4 is "0", while the lower side thereof is selected when the value of this bit-4 is "1". This bit-4 is ignored when the vertical double-enlargement is not performed, i.e., when the value of bit-5 is "0". Further, bit-3 is the bit for designating one of a right side or a left side of font which is to be displayed when the horizontal double-enlargement is designated. More specifically, the right side of font is designated when the value of bit-3 is "0", while the left side thereof is designated when the value of bit-3 is "1". This bit-3 is ignored when the horizontal double-enlargement is not performed, i.e., when the value of bit-6 is "0". Furthermore, bit-2 to bit-0 are reservation bits.

Incidentally, each bit function within each attribute data described before is only one example, hence, it is possible to set an arbitrary definition at each bit in accordance with several kinds of modes.

Figure 4:
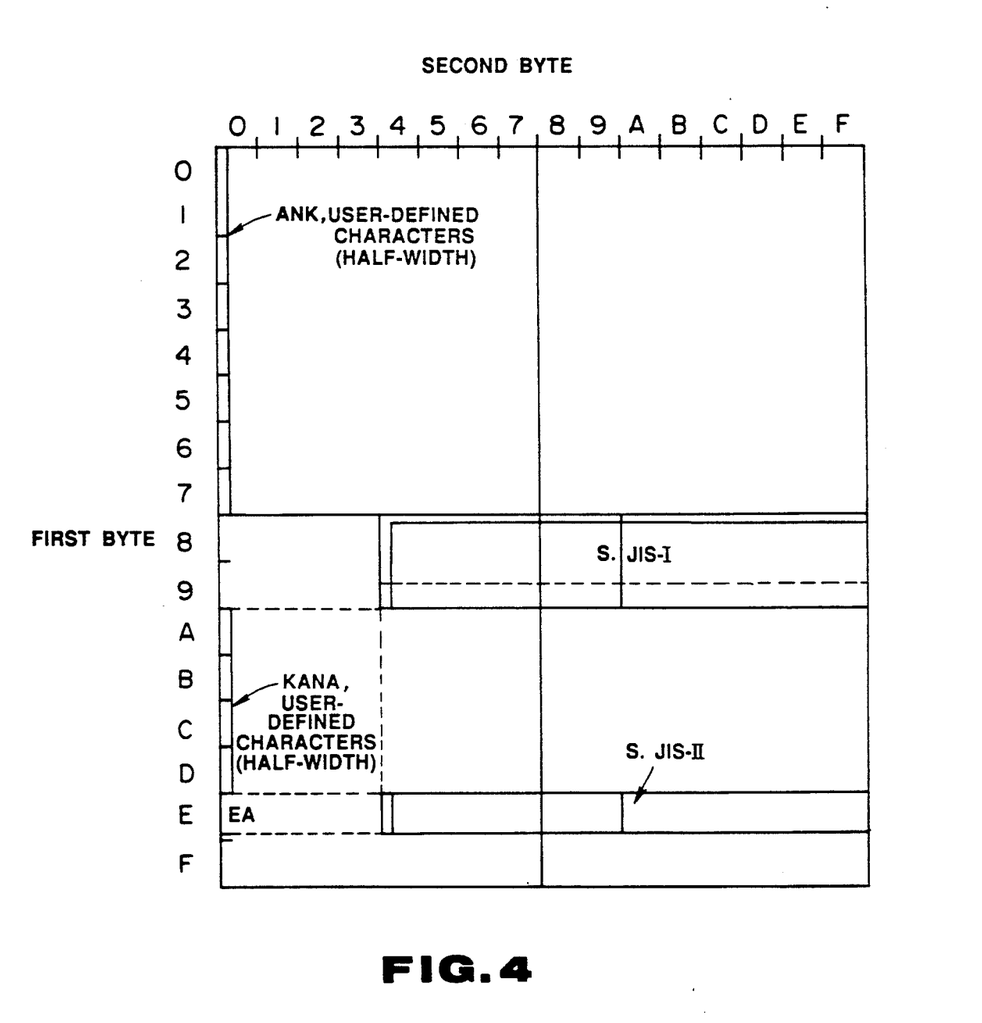
FIG. 4 shows a code map of the character code in the present embodiment.

The character code of so-called Shift Japanese Industrial Standard (Shift JIS) is adopted as the character code of the present embodiment. In this Shift JIS, the section of Chinese characters in JIS C 6226 standard is transferred to un-used section thereof so that assignment positions of Chinese characters will not be overlapped with normal assignment positions of alpha-numeric characters, and FIG. 4 shows the code map thereof. In FIG. 4, areas designated by marks "S.JIS-I" and "S.JIS-II" are Chinese character sections, and each Chinese character in these areas is designated by a character code of two bytes. In addition, the alpha-numeric characters (ANK), user-defined half-width characters and the Japanese syllabary (KANA) characters are all displayed in a half-width. Each of these half-width characters is designated by a character code of one byte, i.e., (00) to (7F) and (A0) to (DF).

Figure 5:
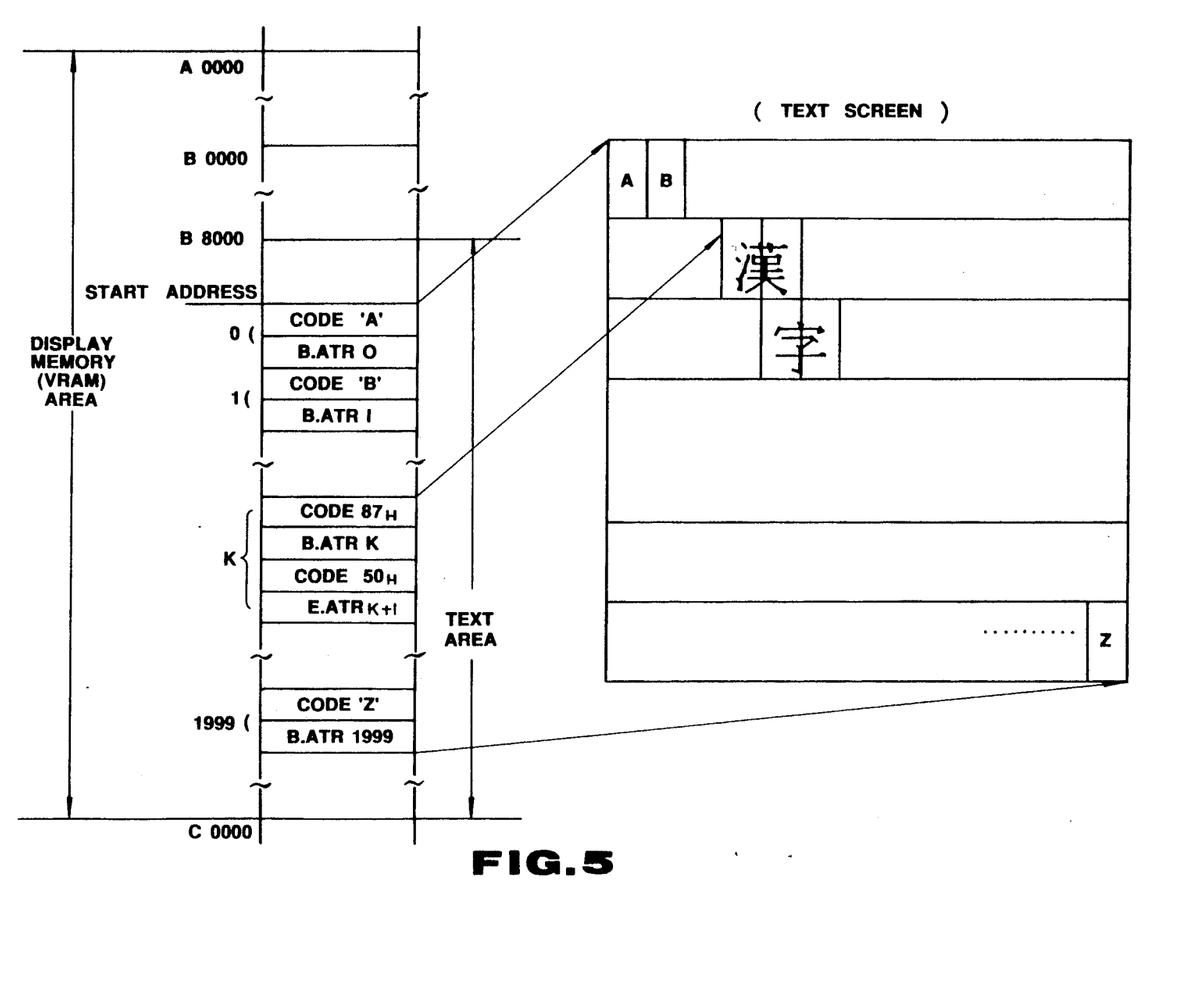
FIG. 5 shows a relation between the character codes within a VRAM 3 and displayed characters.

Next, FIG. 5 shows relations between the display characters and the data within the VRAM 3. As shown in FIG. 5, the Chinese character represented by the character code of two bytes is displayed in full-width, while each of the English characters and figures represented by the character code of one byte is displayed in the half-width. Therefore, the area occupied by one character on the display screen corresponds to the area occupied by the character code of one character within the VRAM 3. Further, one pair of the character code of one byte and the attribute data of one byte are used in each of the English characters and figures which is displayed in the half-width. In case of the Chinese character which is displayed in the full-width, each byte of the character code of two bytes is provided with the attribute data. In addition, second byte of character code representative of the Chinese character is provided with the extended attribute data (see FIG. 3B).

Incidentally, in the area map of VRAM 3 shown in FIG. 5, the character codes and the attribute data are arranged alternatively. However, in each pair, the character code is stored in the first plane 3a, while the attribute data are stored in the second plane 3b. In addition, these character code and attribute data in each pair are set to have the corelated address.

As shown in FIG. 1, address buses and data buses of these first and second planes 3a and 3b are all connected to a common bus 15 of eight bits. This common bus 15 is used by a time division system. More specifically, the character codes, the attribute data and the address data are respectively outputted to the common bus 15 in accordance with timings assigned by the CRT controller 2. In this case, the address data include row address data and column address data, which are outputted by the time division system.

The VRAM 3 stores several data as described above. When the CRT controller 2 reads the character code from the VRAM 3, the CRT controller 2 reads the font data corresponding to the read character code from a character generator shown in FIG. 2. Then, the CRT controller 2 converts the read font data into serial data, which are supplied to the CRT display unit 4. In addition, based on the attribute data accompanied with the character code at this time, the CRT controller 2 performs display color control, blinking control or horizontal double-enlargement/vertical double-enlargement display etc. (, which will be described later).

Next, 10 designates a Chinese character display unit which is constituted by a control portion 10a and a character generator 10b. Next, description will be given with respect to the constitution of Chinese character display unit 10.

A code fetch portion 20 shown in FIG. 1 has an input terminal (of eight bits) which is connected to the common bus 15. At timings when the CRT controller 2 fetches the character codes and the attribute data, the code fetch portion 20 fetches such codes and data. In this case, the CRT controller 2 outputs output enable signals (not shown) of the first plane 3a and the second plane 3b, and the code fetch portion 20 discriminates the attribute data from the character codes based on such output enable signals. Both of the attribute data of two bytes and the character code of two bytes are stored in the specific flip-flop (i.e., D type flip-flop). In FIG. 1, 21 designates an attribute data latch portion having a storage capacity of two bytes. The attribute data which are fetched in the code fetch portion 20 are sequentially supplied to this attribute data latch portion in a fetching order of data within the code fetch portion 20. In addition, 22 designates a character code latch portion which consists of a first storing portion 22a and a second storing portion 22b. The character codes are sequentially supplied to this second storing portion 22b in the fetching order of character codes within the code fetch portion. The character codes which have been supplied to the second storing portion 22b are sequentially supplied to the first storing portion 22a. Further, 23 designates a character width detecting portion which detects whether the character code within the first storing portion 22a represents the character code of full-width or half-width based on data of one or some bits (e.g., upper three bits) within the data stored in the first storing portion 22a. The character of full-width is designated by the character code of two bytes as described before. Since the first byte of this character code represents "8", "9" or "E" as shown in FIG. 4, it is possible to discriminate the character code of full-width based on the upper three bits of data stored in the first storing portion 22a. This character width detecting portion 23 is constituted by combination of logical gates. When the character code represents "8", "9" or "E", the detecting portion 23 outputs a full-width detection signal ZEN.

Next, 24 designates a CG address generating portion which generates addresses of the character generator 10b shown in FIG. 2 based on the character codes. In the present embodiment, the character generator 10b is constituted by a plurality of read only memories (ROM) and non-volatile RAM for making the user-defined characters. The CG address generating portion 24 generates a chip select signal and an address signal corresponding to the code map (see FIG. 4) based on the character codes. In this case, when the full-width detection signal ZEN is supplied from the character width detecting portion 23, the CG address generating portion 24 generates the addresses based on the character codes of two types within the first and second storing portions 22a and 22b. On the other hand, when the full-width detection signal ZEN is not supplied from the character width detecting portion 23, the CG address generating portion 24 generates the addresses based on the character codes within the first storing portion 22a. When font data of half-width character are read out, the character generator 10b outputs font data of eight dots in a horizontal direction of one character. On the other hand, when font data of full-width character are read out, the character generator 10b outputs the font data of sixteen bits in a horizontal direction of character by two times. In other words, the font data of eight dots are outputted at a first time, and then the front data of remained eight dots are outputted at a second time. Such font data outputting operation of the character generator 10b differs depending on control signals supplied from the attribute processing portion 30. In other words, such operation depends on the contents of the attribute data, which will be described later.

Next, in a parallel-to-serial (P/S) converter 26, the font data of eight bits supplied from the character generator 10b are converted into serial data based on a dot clock DCK or a half clock of dot clock DCK, and then such serial data are outputted as dot data. In this case, the control signal supplied from the attribute processing portion 30 changes over a serial data converting speed. This P/S converter 26 sequentially outputs data in an order; from data supplied to an input terminal H thereof to data supplied to an input terminal A thereof.

An exclusive OR gate 27 takes an exclusive OR between the output signal of P/S converter 26 and an output signal of cursor enable signal generating portion 43. This exclusive OR gate 27 is subjected to a through state against the dot data outputted from the P/S converter 26 when the cursor enable signal generating portion 43 does not generate a cursor enable signal CEN (i.e., "1" signal). A color code generating portion 28 reads the predetermined color code from a color palette 31 and then outputs such predetermined color code to the CRT display unit 4 with respect to each dot data supplied thereto via the exclusive OR gate 27. This predetermined color code is the color code which is designated by the attribute processing portion 30. More specifically, the attribute processing portion 30 supplies a control signal to the color code generating portion 28 to thereby select the color code corresponding to each bit function of the basic attribute data (see FIG. 3A) which are supplied from the attribute data latch portion 21. For example, in the case where the basic attribute data designates the red color as a foreground color, the attribute processing portion 30 controls the color code generating portion 28 to read the red color code from the color palette 31. In addition, the attribute processing portion 30 designates processes corresponding to other bits of the basic attribute data to the color code generating portion 28. In short, the attribute processing portion 30 designates on/off of blinking, reverse and underline etc. Further, when a flag SSA is set, the attribute processing portion 30 recognizes the attribute data of second byte within the attribute data latch portion 21 as the extended attribute data, and then processes corresponding to each of bits of the extended attribute data will be performed. On the contrary, when the flag SSA is not set, the attribute processing portion 30 ignores such attribute data of second byte. The processes based on the extended attribute data will be described later.

Next, an address fetch portion 40 fetches the address data outputted on the common bus 15. The row address data and column address data are alternatively outputted on the common bus 15 by the time division system. The address fetch portion 40 discriminates these addresses by a strobe signal (not shown) outputted from the CRT controller 2, and then the address fetch portion 40 stores these addresses as one pair of data. The row address data and column address data stored in the address fetch portion 40 are supplied to a comparator portion 41 wherein it is judged whether these data coincide with data within a register 42 or not. When the comparator portion 41 detects the coincidence between the above data, the comparator portion 41 outputs a coincidence detection signal to the cursor enable signal generating portion 43. In this case, the CPU 1 prewrites the address where the cursor is to be displayed into the register 42. When the coincidence detection signal is supplied to the cursor enable signal generating portion 43, the cursor enable signal generating portion 43 supplies a cursor enable signal CEN (i.e., "1" signal) to a second input terminal of the exclusive OR gate 27. In this case, when the character width detecting portion 23 outputs the full-width detection signal ZEN, the cursor enable signal generating portion 43 outputs the cursor enable signal CEN in a period corresponding to a display time of full-width character. On the contrary, when the character width detecting portion 23 does not output the full-width detection signal ZEN, the cursor enable signal generating portion 43 outputs the cursor enable signal CEN in a period corresponding to a display time of half-width character. In the period when the cursor enable signal CEN is supplied to the exclusive OR gate 27, the exclusive OR gate 27 functions as an inverter against the P/S converter 26. For this reason, the cursor will be displayed as the character whose color is reversed.

[B] OPERATIONS OF AN EMBODIMENT

Next, description will be given with respect to operations of the present embodiment.

At first, in the case where the programs used in the CPU 1 are those of the Western standard type personal computers and therefore the Chinese characters are not displayed, the Chinese character display unit 10 does not operate so that the display operation in the CRT display unit 4 is controlled by the CRT controller 2. On the other hand, in the case where the programs used in the CPU 1 are those for the Japanese and therefore it is necessary to display the Chinese characters, the CRT controller 2 executes the access to the VRAM 3 under the control of CPU 1 but this CRT controller 2 does not control the CRT display unit 4. Instead of the CRT controller 2, the Chinese character display unit 10 fetches access information of the CRT controller, i.e., the character codes, the attribute data and the address data respectively. Based on these fetched data, the Chinese character display unit 10 controls the CRT display unit 4. Hereinafter, description will be given with respect to the operation in this case.

First, the CRT controller 2 accesses the VRAM 3 in accordance with scanning of display screen. The code fetch portion 20 takes in the character code and attribute data which are accessed by the CRT controller 2. The character code which is taken in this code fetch portion 20 is supplied to the character code latch portion 22, and then the character width detecting portion 23 judges whether this character code represents the full-width character or the half-width character. When this character code represents the full-width character, the character width detecting portion 23 outputs the full-width detection signal ZEN, so that the CG address generating portion 24 generates the address of the character generator 10b based on the character code of total two bytes which are stored in the first and second storing portions 22a and 22b. On the contrary, when the above character code represents the half-width character, the character width detecting portion 23 does not output the full-width detection signal ZEN, so that the CG address generating portion 24 generates the address of the character generator 10b based on the character code stored in the first storing portion 22a. Next, in the case where the font of full-width character is accessed, the character generator 10b outputs the data of eight dots within the data of sixteen dots in the horizontal direction of the character by two times. On the contrary, in the case where the font of half-width character is accessed, the character generator 10b outputs the data of eight dots in the horizontal direction of the character. Thereafter, the P/S converter 26 sequentially converts the data outputted from the character generator 10b into the serial data, and then such serial data are supplied to the color code generating portion 28 via the exclusive OR gate 27. The color code generating portion 28 generates the color code with respect to respectively supplied dot data based on the control signal from the attribute processing portion 30, and then such generated color code will be outputted to the CRT display unit 4. Thus, the CRT display unit 4 displays the character designated by the character code on the display screen. In addition, this character is displayed in the color and other attributes (such as blinking, reverse etc.) designated by the attribute data.

In this case, the flag SSA is at set state. In the case where the Chinese character code is further read out, the following processes will be executed in addition to the above-mentioned processes.

First, the attribute processing portion 30 recognizes the attribute data of second byte as the extended attribute data, so that the processes corresponding to each bit function shown in FIG. 3B are executed.

(1) In the case where the bit-7 of extended attribute data (which designates the boldface) takes the value "1":

In this case, the P/S converter 26 generates a delay clock which is obtained by delaying the dot clock DCK by one clock based on the control signal from the attribute processing portion 30. Then, the P/S converter 26 takes the logical OR between the serial data which are generated based on the above delay clock and other serial data which are generated based on the original dot clock DCK. Thereafter, the P/S converter 26 outputs the serial data which are obtained by effecting the above logical OR via the output terminal Q thereof. Thus, the outputted serial data are the data which represent boldfaced font in the horizontal direction (i.e., the scanning direction), so that such font is displayed by being boldfaced by one dot in the horizontal direction.

(2) In the case where the bit-6 of extended attribute data (which designates the horizontal double-enlargement) takes the value "1":

In this process, the corresponding Chinese character is displayed in the horizontal double-enlargement. The displayed part of font differs depending on the content of the bit-3, which will be described as follows.

In the case where the bit-3 takes the value "1", the font data of eight bits in the left side of the corresponding character are read from he character generator 10b. Then, in the P/S converter 26, the supplied font data of eight bits are subjected to the parallel-to-serial conversion based on the half clock of the dot clock DCK. Such obtained serial data are supplied to the color code generating portion 28 via the exclusive OR gate 27. Meanwhile, the CRT display unit 4 performs the display operation based on the ordinary dot clock DCK. As a result, the left side part of the font is subjected to the double-enlargement in the horizontal direction, so that the font is displayed in the full-width (see FIG. 6).

In addition, in the case where the bit-3 of the extended attribute data takes the value "0", the font data of eight bits in the right side of the corresponding character are read from the character generator 10b. In the P/S converter 26, such font data of eight bits are subjected to the parallel-to-serial conversion based on the half clock of the dot clock DCK. Such converted serial data are supplied to the color code generating portion 28 via the exclusive OR gate 27. Therefore, similar to the case described before, the right side part of the font is subjected to the double-enlargement in the horizontal direction, so that such font will be displayed in the full-width (see FIG. 6).

Figure 6:
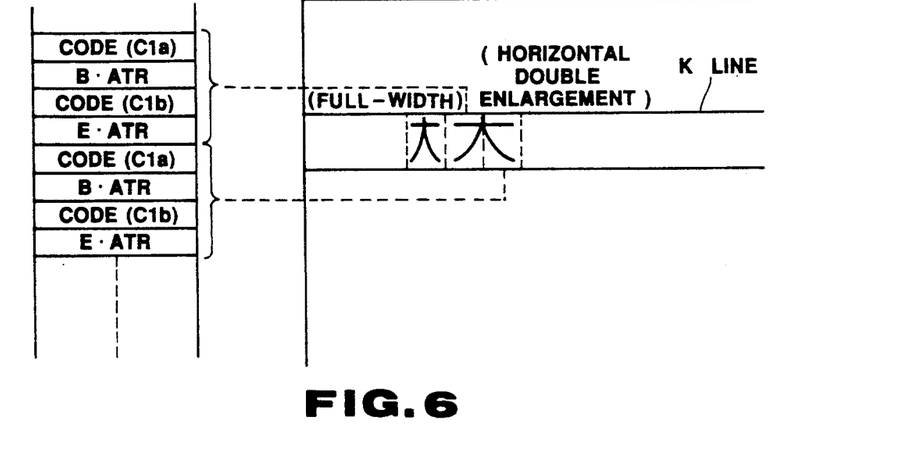
FIGS. 6 and 7 show examples of relations between data within VRAM and displayed characters.

By continuously performing the left side display and right side display on the same Chinese character code, it is possible to double-enlarge the font of the corresponding Chinese character in the horizontal direction, so that such font will be displayed in the double of the full-width. Thus, the Chinese character can be displayed in the double-enlarged size. FIG. 6 shows relation between the display character and examples of data within the VRAM 3 when the double-enlargement display is executed. Two character codes $C_{1a}$ and $C_{1b}$ shown in FIG. 6 designate one Chinese character. The character code $C_{1a}$ is accompanied with basic attribute data B.ATR, while the character code $C_{1b}$ is accompanied with extended attribute data E.ATR. In this case, both of bit-6 and bit-3 of first extended attribute data E.ATR take the same value "1", while bit-6 takes the value "1" but bit-3 takes the value "0" in second extended attribute data E.ATR. It can be understood from FIG. 6 that the area occupied by the horizontally double-enlarged character on the display screen corresponds to the area occupied by the data representative of the displayed character.

(3) In the case where the bit-5 of extended attribute data (which designates the vertical double-enlargement) takes the value "1":

This case relates to the process for performing the double-enlargement in the vertical direction with respect to the corresponding character. The displayed part of the font differs depending on the content of bit-4 of the extended attribute data, which will be described below.

First, in the case where such bit-4 takes the value "1", font data representative of the upper half part of the corresponding character are read from the character generator 10b. In this case, the same address of the character generator 10b is accessed by two times in correspondence with the scannings of two times on the display screen. Therefore, the same font data are read from the character generator 10b in correspondence with adjacent two lines, so that the upper half part of the font is double-enlarged in the vertical direction (see FIG. 7).

In the case where the bit-4 of the extended attribute data takes the value "0", font data representative of the lower half part of the corresponding font are read from the character generator 10b. Other operations in this case are identical to those described above.

Figure 7:
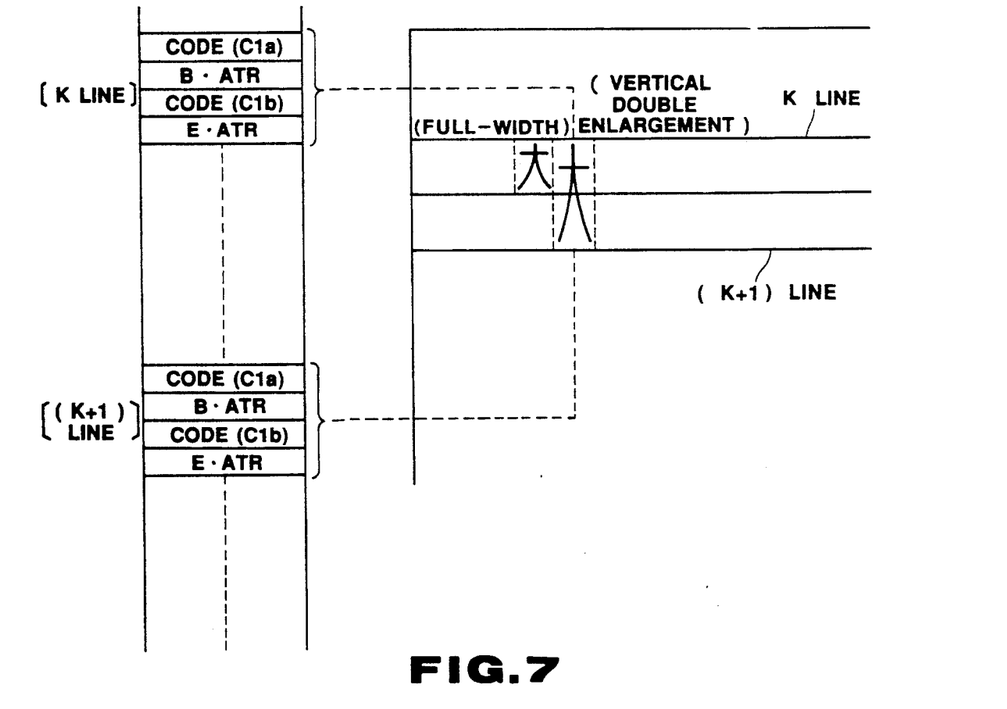

Thereafter, the upper half part and lower half part of the font are sequentially displayed at the same horizontal position on the adjacent lines k and (k+1) respectively, so that the font is double-enlarged in the vertical direction. Then, the vertical double-enlargement is completed. FIG. 7 shows the relation between the display character and examples of data within the VRAM 3 when the character is displayed by the vertical double-enlargement. In this case, data representative of the upper half part and data representative of lower half part are stored in respective areas corresponding to the same horizontal position on the adjacent lines k and (k+1). Both of the bit-6 and bit-4 of the first extended attribute data E.ATR takes the same value "1", while the bit-6 of the second extended attribute data E.ATR takes the value "1" but the bit-4 thereof takes the value "0". Even in such vertical double-enlargement display operation, the area occupied by the double-enlarged character on the display screen corresponds to the area occupied by the data of the corresponding character.

(4) In the case where both of the bit-6 and bit-5 of the extended attribute data take the same value "1", both of the operations described in (2) and (3) are simultaneously performed. More specifically, both of the horizontal doubleenlargement and the vertical double-enlargement are simultaneously performed so that fourfold-enlargement display operation will be performed. As is understood from the above description, even in such fourfold-enlargement display operation, the area occupied by the character on the display screen corresponds to the area occupied by the data of the character within the memory. After all, in the present embodiment, the size of the character on the display screen corresponds to the data quantity of the character. In short, the memory in the present embodiment can adopt the memory map identical to that of the Western standard type computer.

Above are the processes based on the extended attribute data.

Next, description will be given with respect to cursor display process. First, the address fetch portion 40 fetches the address data outputted from the CRT controller 2. Such fetched address data are compared with the data within the register 42 in the comparator portion 41. When the comparator portion 41 detects the coincidence between these two data, the cursor enable signal generating portion 43 generates the cursor enable signal CEN. As a result, the exclusive OR gate 27 functions as an inverter with respect to the dot data representative of the character at the position where the cursor must be displayed. Thus, the cursor will be displayed as an reversely displayed character.

Incidentally, the present embodiment have the advantage in that it is possible to display the Chinese characters by only adding the Chinese character display unit 10 to the Western standard type personal computer. In addition, the present embodiment can utilize the VRAM 3 and the access of the CRT controller 2 as it is. Hence, the present invention does not require any changes in the hardware constitution of the Western standard type personal computer at all.

In the present embodiment, the control portion 10a is additionally equipped with the CRT controller 2. However, it is possible to assemble these equipments into one body, so that it is possible to constitute one circuit having these functions.

Further, the present embodiment is given for displaying the Chinese characters and the Japanese syllabary in the Japanese. However, it is possible to modify the present invention so that languages other than the Japanese can be displayed. More specifically, it is possible to modify the present invention so that it is possible to display the language which must use two or more kinds of character codes in order to designate one character, namely, the Chinese or the Korean, for example. In addition, the present invention can promote the attribute function to be enlarged.

In the present embodiment, when the flag SSA is cleared, the extended attribute data are not recognized. Therefore, when the software having the character codes representative of the English characters and figures only is executed, the basic attribute data can not be recognized by mistake as the extended attribute data by clearing the flag SSA. As described heretofore, in the case where the English characters and figures are only to be used or in the case where both of the Chinese character codes and the extended attribute data are used, it is possible to change over the function of the character display apparatus with ease by rewriting the content of the flag SSA. Hence, it is quite advantageous in that the present invention can obtain the extremely high compatibility.

As described heretofore, the present invention can display the Chinese characters etc. in the text mode even when the Western standard type personal computer is used. Thus, it is possible to increase the execution speed and promote the compatibility and portability of the software with ease. In addition, it is possible to enlarge the attribute function of the personal computer so that many kinds of characters can be displayed.

What is claimed is:

1. A character display apparatus for displaying on a display screen, several kinds of characters including said apparatus comprising:
   (a) a memory portion for storing character codes, each said character code designating corresponding character data and attribute data representative of a characteristic of said several kinds of characters, the memory portion having a first memory plane for storing the character data and a second memory plane for storing the attribute data;
   (b) a code fetch portion for retrieving character codes consisting of character data and attribute data from the memory portion, the code fetch portion discriminating the attribute data from the character data;
   (c) an attribute data latch portion for sequentially receiving and storing the attribute data that is retrieved by the code fetch portion;
   (d) a character code latch portion consisting of a first starting portion and a second storing portion, the second storing portion sequentially receiving and storing the character codes that are retrieved by the code fetch portion, the character codes that are supplied to the second storing portion are sequentially supplied to the first storing portion;
   (e) a character width detecting portion for detecting whether the character code within the first storing portion represents a full-width character code or a half-width character code, the full-width character code being designated by two bytes, the half-width character code being designated by one byte, the character width detecting portion providing a character width signal indicating half-width or full-width character codes;
   (f) a character generator address generating portion receiving the character codes, the character generator address generating portion providing character generator addresses based on the character codes, the character generator address generating portion providing a chip select signal and a character generator address signal, the character generator address generating portion generating character generator addresses based on the character codes within the first and the second storing portions when a full-width character signal is provided, the character generator address generating portion generating character generator addresses based on the character codes within the first storing portion when a half-width character signal is provided;
   (g) a first character generator for pre-storing font data corresponding to the alpha-numeric characters at character generator addresses provided by the character generator address generating portion;
   (h) a second character generator for pre-storing font data corresponding to composed Chinese characters at character generator addresses provided by the character generator address generator portion;
   (i) a judgment portion for judging whether each said character code being read from said memory portion in accordance with scanning of said display screen corresponds to one of said alpha-numeric characters or said composed Chinese characters, by judging whether said character code comprises the full-width character code or the half-width character code; and
   (j) a control portion for reading out from said first character generator when said alpha-numeric characters are to be displayed, said font data corresponding to said character code judged by said judgment portion, so that each of said alphanumeric characters is displayed in said attribute represented by said attribute data accompanied with said character code, said control portion reading out from said second character generator when said Chinese characters are to be displayed, said font data corresponding to said character code judged by said judgment portion, so that each of said Chinese characters is displayed in said attribute represented by said attribute data accompanied with said character code.

* * * * *

UNITED STATES PATENT AND TRADEMARK OFFICE
CERTIFICATE OF CORRECTION

PATENT NO. : 5,251,293
DATED : October 5, 1993
INVENTOR(S) : Ishii, et al

It is certified that error appears in the above-indentified patent and that said Letters Patent is hereby corrected as shown below:

Column 9, Line 33, change "he character", to
--the character--.

Column 10, Line 60, change "doubleenlargement", to
--double-enlargement--.

Column 12:

In Claim 1, Line 3, before "said apparatus", insert
--alpha-numeric characters and composed Chinese characters--.

In Claim 1, Line 20, delete "starting", and insert
--storing--.

Signed and Sealed this

Eighteenth Day of October, 1994

Attest:

BRUCE LEHMAN

*Attesting Officer*  *Commissioner of Patents and Trademarks*